Patented Aug. 26, 1941

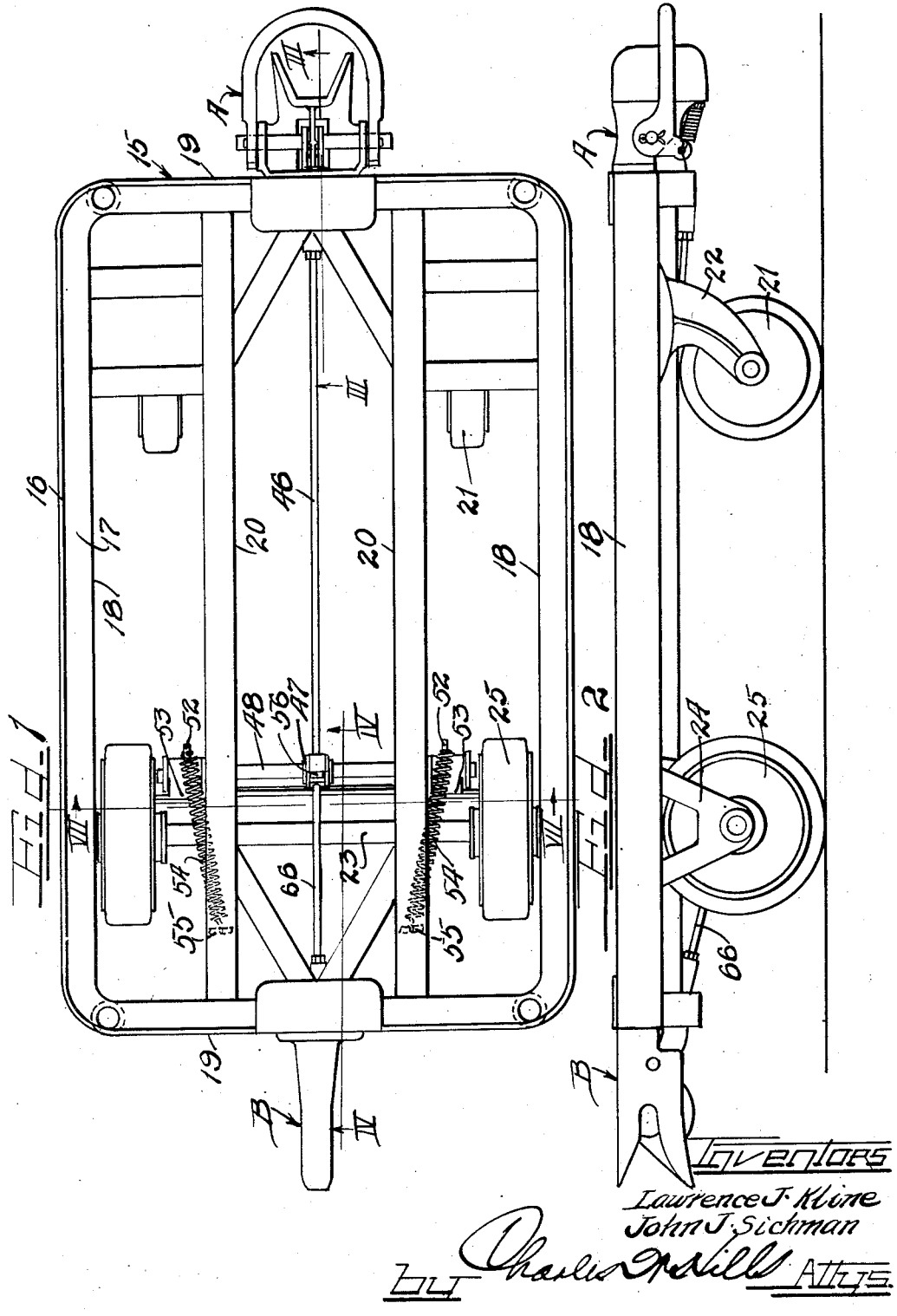

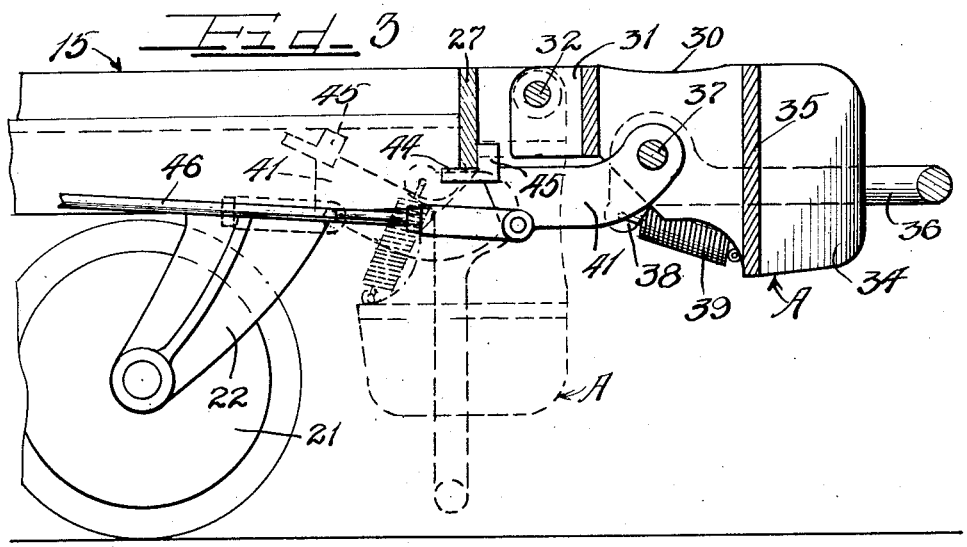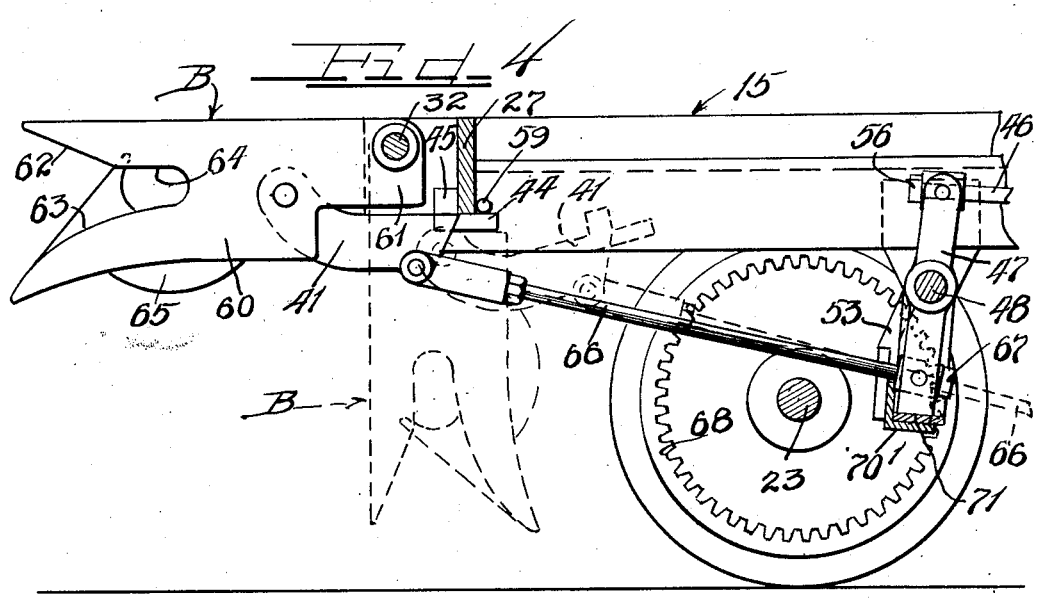

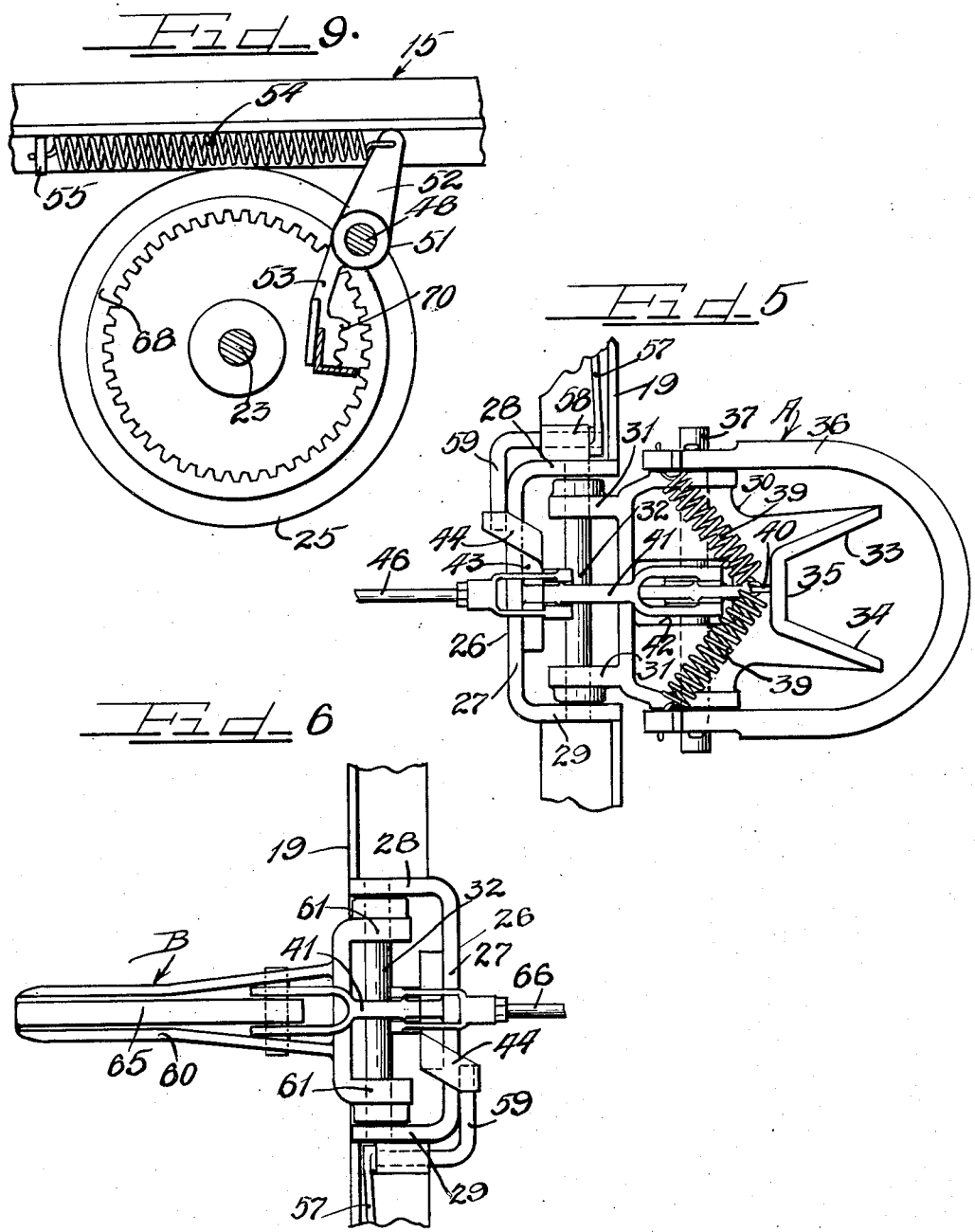

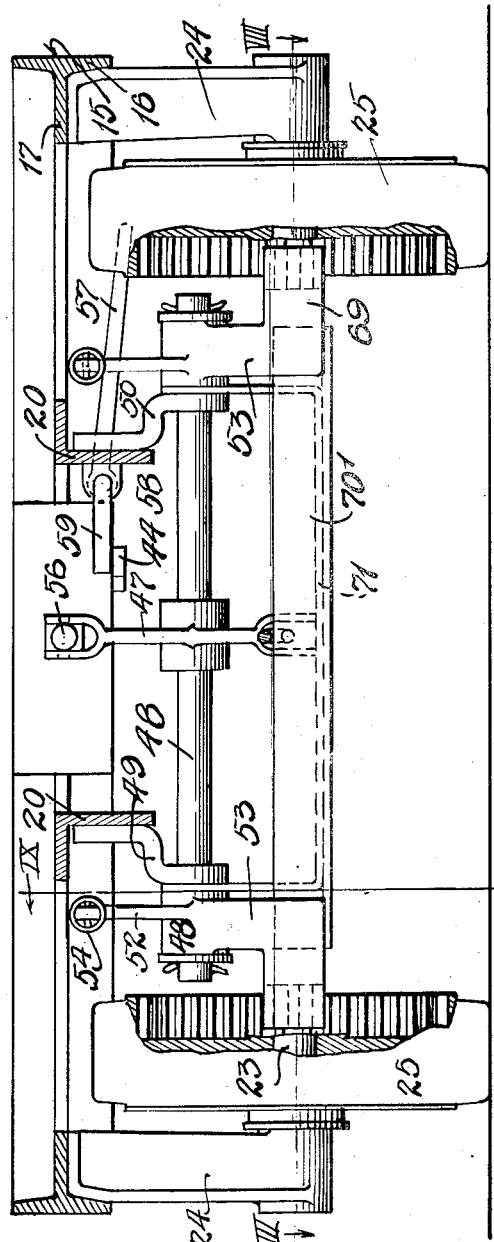
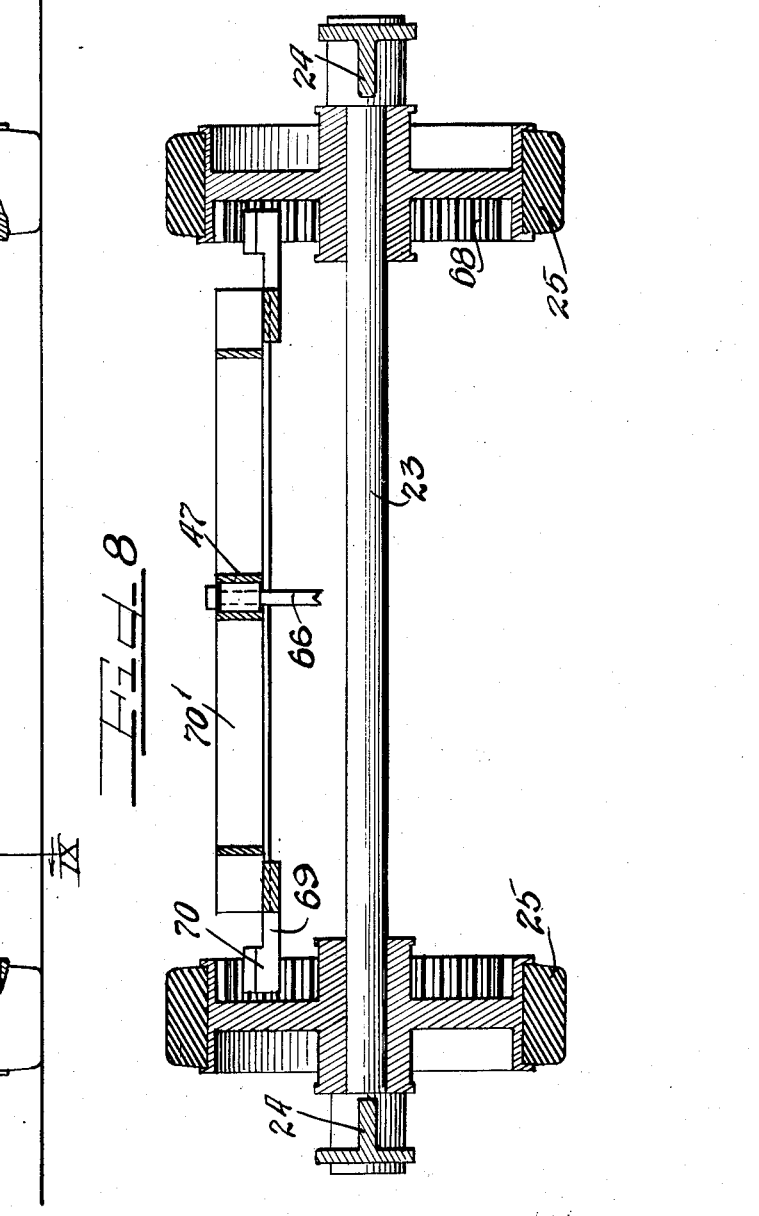

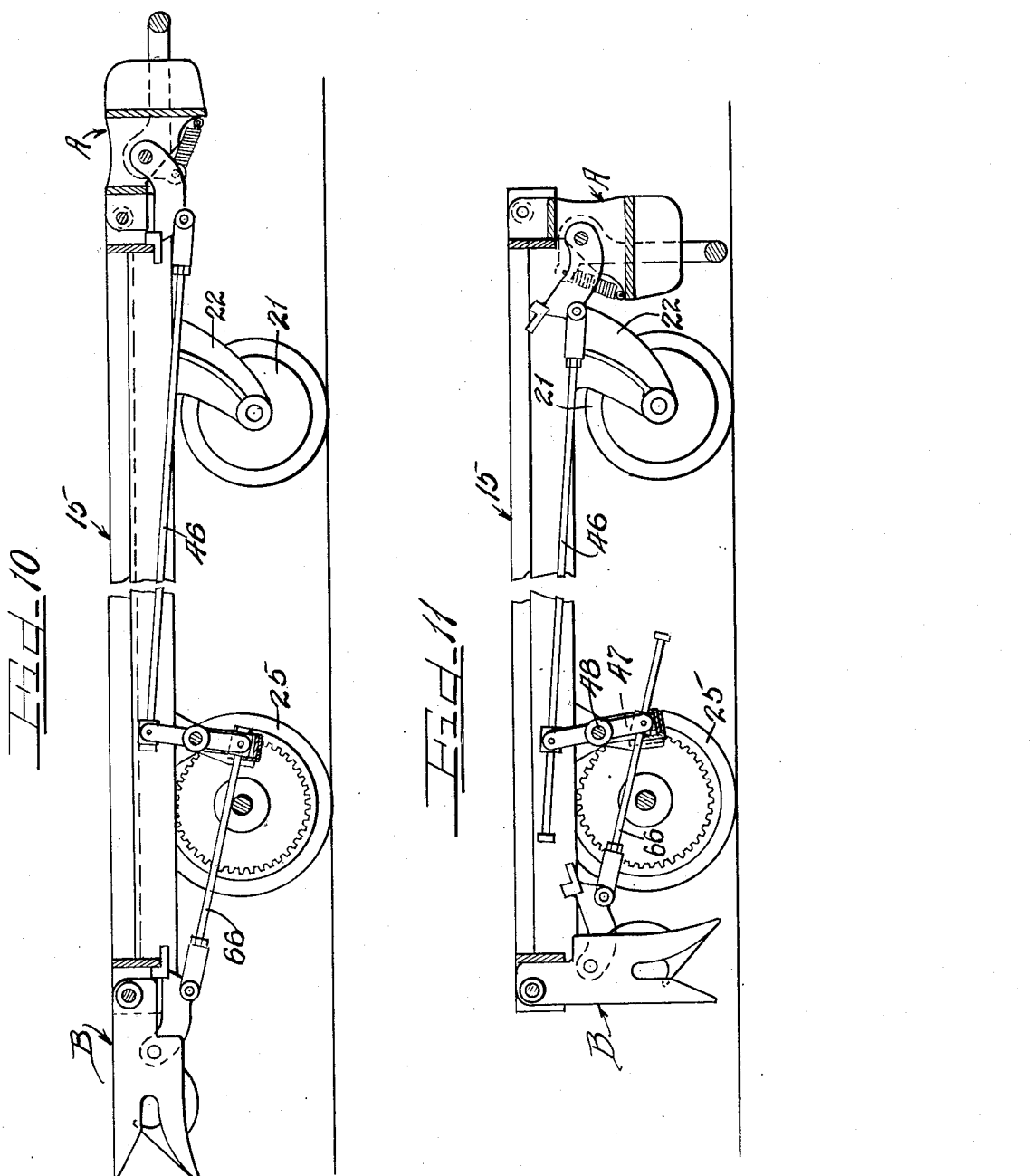

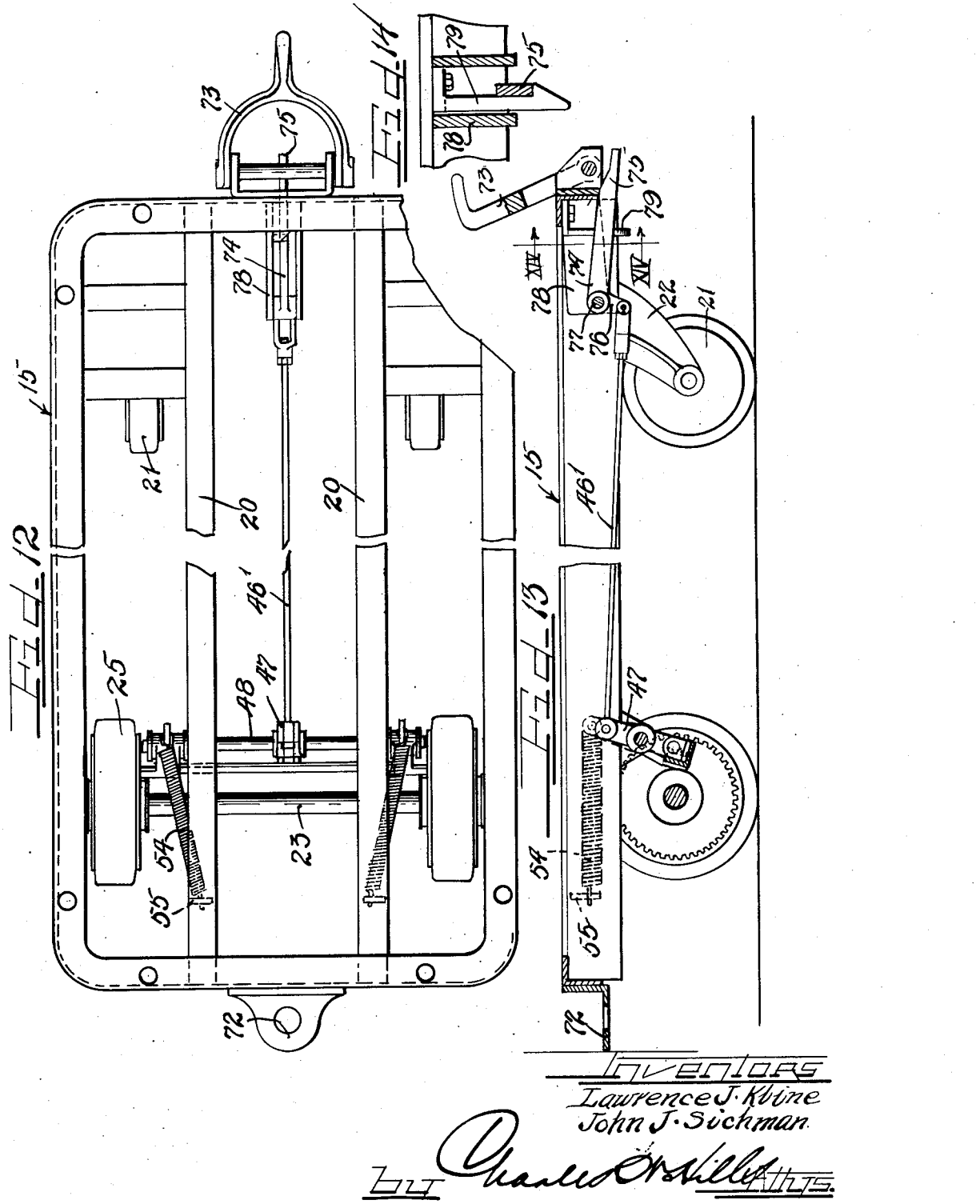

2,253,791

UNITED STATES PATENT OFFICE 2,253,791

VEHICLE WHEEL LOCK

Lawrence J. Kline, La Grange, and John J. Sichman, Chicago Heights, Ill., assignors to The Mercury Manufacturing Company, Chicago, Ill., a corporation of Illinois Application January 25, 1939, Serial No. 252,754

13 Claims. (Cl. 188—119)

The present invention relates in general to wheeled vehicles and more particularly to trucks of the type utilized for moving freight and merchandise in warehouses, freight depots and the like, and which trucks are provided with couplers for coupling together a plurality of trucks in trains. The trucks are also used for transporting freight and merchandise which is loaded onto the trucks at a point of origin and the loaded trucks are then loaded into freight cars or onto ships, conveyed to destinations, and unloaded at the destinations, without any of the freight or merchandise being removed from the trucks at any time.

In connection with the use of trucks of this type, it has been highly desirable to furnish the trucks with collapsible type couplings which may be utilized in the usual manner for the coupling of the trucks into a train, but which may be collapsed or swung out of the way when the trucks are loaded into cars or aboard ship. Thus the trucks may be positioned in the car with their ends in abutting relation or in abutment with a wall surface without interference from the associated couplings, the space being occupied by the truck being limited only by the truck framework.

Moreover, it is also desirable to provide suitable means for preventing shifting of the trucks particularly when loaded into freight cars. In the coupling arrangement and anti-shifting device as heretofore incorporated in trucks of this type, the couplings and anti-shifting device have been individually operable, thus making it necessary to perform a number of individual and distinct operations to place the couplings in collapsed position or extended position when desired, and to set or release the anti-shifting means in active or non-active positions.

The present invention has to do with improved means for anchoring the trucks of particularly the freight house type against shifting or displacement when loaded in freight cars or onto decks of ships, and including novel means for actuating the anchoring means in response to movements of the coupler elements.

It is therefore an object of the present invention to provide improved means for anchoring or securing freight house trucks against shifting when loaded into freight cars or on the decks of ships.

Another object of the invention is to provide anchoring means for freight house trucks, which acts to lock the wheels of the truck against rotation and thereby prevent shifting movements of the truck.

A still further object of the invention is to provide wheel locking means for wheeled vehicles fitted with collapsible couplings, wherein the operation of the locking means is controlled by and dependent upon the position of the couplings.

Another and yet further object of the invention is to provide anchoring means for wheeled vehicles which may be manually released and which will automatically set to prevent shifting movement of the vehicle.

It is also an object of the invention to provide in a vehicle with couplings of the collapsible type at either end, a wheel locking mechanism arranged to be actuated depending upon the movements of the couplings. That is, an arrangement in which both couplings must have been moved to collapsed position in order to lock the wheel, but only one coupling need be restored to non-collapsed or normal position in order to release the wheel lock and enable movement of the vehicle.

In accordance with the general features of the present invention, it is proposed to provide complementary couplings bars at the opposite ends of the truck or other vehicle and pivotally support the coupling bars for swinging movement into raised coupling position projecting from the truck body, and to lowered depending position in which the coupling is in non-coupling position. This type of coupling enables the vehicle to be positioned with its coupling end against a wall surface or in abutment with the ends of other vehicles without wasting of floor space.

The truck couplers are preferably arranged so as to be latched in their coupling positions and latch releasing means are provided so that upon releasing the latches of the couplers, the couplers will automatically move to non-coupling position under the action of gravity.

Advantage is taken of the automatic movement of the couplers when released, for actuating a wheel locking mechanism. In the present instance, each of the rear wheels of the truck is provided with a toothed ring which is secured to the wheel for rotation therewith, and a toothed segment is normally biased by a suitable spring into meshed relation with the toothed ring. The respective wheels are independently locked by the toothed segment being moved into meshed relation with the ring, and connections are provided between the toothed segments of the rear wheels and the coupling members at both ends of the truck which will simultaneously move the toothed segments of both wheels out of engagement with their associated toothed rings, when either one of the coupling members is moved to raised coupling position. This connection is also arranged so that both coupling members must be moved to lowered depending positions before the locking mechanism is moved to locking position.

With such an arrangement, when the coupling members are in normal coupling position, it is only necessary to trip both of the couplings so that they may move to depending lowered positions under the action of gravity, and this movement will automatically set the wheel locks.

The above, other and further objects of the invention will be apparent from the following description, accompanying drawings, and appended claims.

Various aspects of the present invention are illustrated in the accompanying drawings, and the views thereof are as follows:

Figure 1 is a plan view of a vehicle, in this instance a truck, equipped with wheel locking mechanism embodying the principles of the present invention.

Figure 2 is a side elevational view of the same.

Figure 3 is an enlarged fragmentary view, partly in section, showing details of the coupling mechanism for actuating the wheel lock at one end of the truck, taken substantially on line III—III of Figure 1.

Figure 4 is an enlarged fragmentary view, partly in section, showing details of the coupling mechanism at the other end of the truck for operating the wheel locking mechanism, taken substantially on line IV—IV of Figure 1.

Figure 5 is an enlarged fragmentary bottom plan view of the coupling element shown in Figure 3.

Figure 6 is a similar view of the coupler shown in Figure 4.

Figure 7 is an enlarged transverse sectional view taken through the truck and having cut-away portions in order to disclose details of certain parts of the wheel locking mechanism, taken substantially on line VII—VII of Figure 1.

Figure 8 is an enlarged horizontal section taken through the rear wheel assembly of the truck, taken substantially on line VIII—VIII of Figure 7.

Figure 9 is an enlarged sectional view showing the cooperative relationship of the wheel lock for one of the rear wheels of the truck, taken substantially on line IX—IX of Figure 7.

Figure 10 is a longitudinal section taken through the truck and showing the couplers in normal coupling position and the wheel lock in non-locking position.

Figure 11 is a view similar to Figure 10, except that the couplers are shown in full lines in lowered depending non-coupling position, and the wheel locking mechanism in locked position relative to the wheel.

Figure 12 is a plan view showing the wheel locking mechanism applied to a different form of truck, and including a modified arrangement for actuating the wheel locking mechanism.

Figure 13 is a longitudinal section through the truck to show the details of the wheel lock operating mechanism.

Figure 14 is an enlarged fragmentary sectional view, showing certain details of the operating mechanism in the modified arrangement, taken substantially on line XIV—XIV of Figure 13.

The drawings will now be explained.

As illustrated in the drawings, the truck to which the present invention is applied is shown as comprising a horizontally disposed frame structure 15 of substantially rectangular form. In the present instance, this frame is illustrated as having a vertical flange 16 and a horizontally extending flange 17 at substantially mid-height of the vertical flange.

As formed, the frame 15 provides side members 18—18 and opposed end members 19—19. The framework is strengthened by means of longitudinally extending spaced apart angle irons 20—20 which connect the end members of the frame.

Adjacent one end of the truck body described above are pivoted caster wheels 21 carried in yokes 22 which are pivotally connected to the frame of the truck. These wheels are freely pivotal as is customary in trucks of this type.

At the rear or other end of the truck body, a shaft or axle 23 is journaled in suitable bearing brackets 24—24, these bearing brackets being suitably supported in depending position from the truck frame. Rear wheels 25—25 are carried by the shaft 23.

The truck is provided at its opposite ends with complementary or mating couplings, each being generally indicated at A and B respectively. It will be noted that the end frames 19—19, at the position of the couplers A and B, are provided with an inwardly recessed section which is formed by a U-shaped frame piece 26, as shown in Figures 5 and 6. This frame piece has an integrally formed bridging portion 27 and spaced legs 28 and 29 which may be welded or otherwise rigidly secured in the end frame structure.

As shown in detail in Figures 3 and 5, the coupler A at the forward end of the truck comprises a bumper head 30. The bumper head is provided at its rear end with spaced lugs 31—31 which are arranged to extend into the recess formed by the U-shaped member 26 of the associated end frame of the truck. These lugs are apertured to receive a pivot pin 32 which has its ends respectively supported in the legs 28 and 29 of the member 26. The member 30 is thus arranged for vertical swinging movement from a normal operative position extending from the end of the truck frame to a depending non-coupling position extending below the associated end of the truck. It will be noted that since this member is pivoted in the recess portion of the frame, the coupler will be disposed rearwardly of the outermost extremity of the frame, when the coupler is in depending position. The bumper head at its outermost or free end is provided with outwardly diverging wing surfaces 33 and 34 which are bridged at their innermost edges by a bridging surface 35, these surfaces cooperating to form a vertically disposed end groove in the bumper head.

A bail member 36 of U-shaped construction is pivotally supported at its ends on a transversely extending pivot pin 37. The bail extends around and forwardly of the groove in the free end of member 30. As shown in Figure 3, the ends of the bail are provided with angularly disposed lugs 38, these lugs being respectively connected to springs 39—39 having their other ends anchored at a common point 40 on the member 30. These springs operate to resiliently retain the bail in substantially horizontal extending coupling position, but enables swinging movement thereof.

A latching bar 41 is provided, this bar having one end extending into an aperture 42 in the bumper bar and pivotally mounted for swinging movement on the pin 37. The latching bar extends rearwardly and below the pivot pin 32 and is provided at its unpivoted end with an abutment member 43 with a laterally extending ledge 44 for engaging with the lowermost edge of the bridging portion of member 26 to limit upward swinging of the latching bar, when the coupler is in normal operating coupling position. The abutment member 43 is also provided with an upstanding portion 45 which is arranged to engage the inner marginal surface at this edge of the bridging portion 27, to prevent rearward shifting of the latching bar and the downward swinging movement of the coupler to depending position.

The latch 41 is connected through a link 46 which is pivoted at one end to the latch and at its other end to a rocker arm 47 fixedly supported on a shaft 48 and extending diametrically on opposite sides thereof. This shaft is supported for rotative movement in spaced bearing brackets 49 and 50 supported in depending position from the frame angle member 20—20. The outermost ends of the shaft 48 pivotally carry rocker arms 51 having oppositely extending portions 52 and 53 disposed on opposite sides of the shaft 48. Each of the arm portions 52 is connected at its outermost end to one end of a tensioning spring 54, the other ends of these springs being respectively anchored to the frame structure as generally shown at 55. The link 46, where it is connected to the rocker arm 47 is arranged for sliding movement in one direction and provided with an end head 56 to prevent relative sliding movement in the opposite direction. The springs 54—54 act to rock the shaft 48 in a counterclockwise direction as viewed in Figure 9 and apply a tensioning force against the latch member 41 which operates to move it in a clockwise direction, as shown in Figure 3, into latching position.

For releasing the latch 41, there is provided a lever 57, as shown in Figure 5, which extends to one side of the coupler. This lever is pivotally supported in a bearing 58 on the leg 28 of member 26, and is provided with a deflected end portion 59 adapted to normally overlie the ledge 44 so that when the lever is pulled upwardly its end 59 will act to depress the abutment member 45 and release the latch for rearward movement.

As soon as this latch is released, the coupler swings to depending position under the action of gravity and the latch member assumes a position as shown in dotted line in Figure 3. This action shifts the connecting link 46 in a longitudinal direction so that it is not now acted upon by the springs 54—54. When it is desired to place the coupling in operative extended position, it is only necessary to manually swing the coupling into extended position, whereupon the member 41 automatically latches the coupler against movement in the opposite direction to depending position.

The complementary coupler B comprises in general a drawbar 60, as shown in Figures 4 and 6, with spaced lugs 61—61 at its innermost end which are pivoted on a pin 32 in the same manner as coupler A.

The drawbar 60 at its outermost end is provided with outwardly diverging guiding surfaces 62 and 63 in vertically disposed relation which communicate at their innermost margins with an end opening slot 64 which is adapted to laterally receive therein the ball 36 of a complementary coupler. This ball is releasably retained within the slot by means of a hook-shaped latching member 65.

It will be noted that this coupler carries a latching member 41 of the same construction as embodied in coupler A and adapted to operate in the same manner for latching the coupler in extended operative position. The latch of coupler B is connected through a link 66 to the end of rocker arm 47 lying on the opposite side of shaft 48 from the end of the arm which is connected to link 46. The link 66 is likewise slidably connected with the arm 47 and provided with a head portion 67 which permits sliding movement of the link through the connection in one direction, but limits its movement in the opposite direction. It will be noted that the springs 54 also act on the link 66 to apply tensioning forces against the associated latching member to move it into latching position, when coupler B is moved to operative extended position.

A releasing lever 57 is also provided at this end of the truck for releasing the latch of coupler B, when it is desired to permit it to move to depending position as shown in dotted lines in Figure 4.

By arranging the couplers as described above, the latches of the respective couplers may be selectively actuated to collapse or lower the selected coupling. In other words, either or both of the couplers may be disposed in extended operative position or in depending collapsed position, as desired.

Advantage is taken of the movement of the couplers from operative to non-operative positions for actuating wheel locking mechanisms associated with the wheels 25—25 of the truck.

As shown in Figures 4 and 9, each of the rear wheels is provided on its inside with an inwardly toothed ring 68 which is fixedly secured to the wheel and concentrically surrounds the wheel axle. As shown in Figure 7, the arm portions 53 of the levers 51 are outwardly deflected to form a right-angled portion 69 which carries at its outer end a segmental toothed integral portion 70, the teeth of which are adapted on rotational movement of the shaft 48 to move into and out of meshed engagement with the teeth on the ring 68. It will be apparent that when the teeth on the segmental portion 70 engage the ring teeth, the wheel will be locked against rotation, but that when the teeth are in unmeshed relation the wheel is free to rotate. The springs 54 act to independently bias the segmental portions 70 into wheel locking positions.

For controlling the wheel locking mechanism, an angle bar 70' is supported below the shaft 48 for swinging movement by means of a supporting bracket 71 of generally U-shaped construction, the bridging portion of the bracket being secured to the angle bar 70' and the respective legs of the bracket being pivotally supported on the shaft 48 outside and adjacent to the brackets 49 and 50 respectively. The bridging portion of the bracket 71 is connected substantially at its mid-point to the downwardly extending portion of the rocker arm 47 so that the angle bar 70', which has its ends respectively overlying the arms 53—53 of lever 51—51, will be swung in response to movement of the shaft 48.

It will be appreciated that when the angle bar 70' is swung away from the arms 53—53, the wheel locking mechanism of each wheel is free to independently move to locking positions, and that when the angle bar is moved in the opposite direction, the wheel locking mechanisms of the respective wheels are simultaneously released.

Thus it is necessary to move both the couplers to depending position as shown in Figure 11 in order to lock the wheels and thus prevent shifting movements of the truck, but the wheel locking mechanism may be released simply by moving either one of the couplers to extended operative position as shown in Figure 10.

Referring to Figures 12 and 13, there is shown a wheel locking mechanism which includes a modified operating mechanism which is of modified construction. The truck in this instance instead of being provided with collapsible type couplings at its ends is provided with a couplings eye 72 at its rear end and a coupling hook 73 at its forward end, the coupling hook being of any suitable construction, but pivoted for swinging movement.

In this arrangement, the wheel locking mechanism is not actuated by means of the coupler movement, but is instead controlled by an actuating lever 74 having a long arm 75 and a short arm 76 in substantially right-angled relation. This lever is pivotally mounted at the junction of these arms on a pivot pin 77 having its ends supported in a bracket 78, which is secured in any appropriate manner at one end on the forward end frame of the truck. The lever arm 75 is arranged to move between the legs of the bracket and is of sufficient length to extend below the end frame of the truck to a position below the pivotal mounting of the coupling members 73.

The rocker arm 47 is in this case connected to one end of a link 46' which has its other end pivotally connected to the outermost end of arm 76 of the member 74. The arm 75 is normally held in the raised position as shown in full lines in Figure 13 by means of a latching hook 79, as shown in Figure 14, which is supported from the end frame in depending position, this hook being disposed between the legs of the bracket 78 and so positioned as to hook over the lever 75 in raised position.

When it is desired to set the wheel locking mechanism, the arm 75 is released by moving it laterally until it is disengaged by the hook, whereupon the springs 54 act to set the wheel locking mechanism. To release the mechanism, the arm 75 is raised until it is latched by the hook 79 and retained in raised position.

Trucks having couplings and wheel locking mechanisms constructed in accordance with the present invention find particular application by railroads for shipping L. C. L. freight as the material may be placed on a truck and the truck with the material thereon stowed in a freight car with the ends of the trucks in abutting relation without the necessity of having to utilize greater floor space than the space actually necessary for the truck as limited by its framework. Collapsing of the couplers automatically sets the wheel locking mechanism so that the truck is securely held against shifting movement. The truck may be transported to destination in the car and there, manually or by means of a tractor pushed or drawn to its point of destination, unloaded and the truck returned to the railroad for reuse. This manner of handling freight results in a material reduction in the cost of transportation as compared with the usual method of handling.

While the wheel locking mechanism may be incorporated in different wheel constructions, it is preferred that it be applied to wheels having a rubber tread, since there is greater resistance to shifting movement than in cases where the wheels have plain tread surfaces of metal or the like.

Although we have described certain specific uses for the embodiment of the invention herein disclosed, it will be understood that its use may be extended to all fields wherein it is desired to use vehicles with couplers which may be collapsed and wheel locking mechanisms for preventing shifting movement of the vehicle.

The invention has been described herein more or less precisely as to details, yet it is to be understood that the invention is not to be limited thereby as changes may be made in the arrangement and proportion of parts, and equivalents may be substituted, without departing from the spirit and scope of the invention.

We claim as our invention:

1. In combination with a wheeled vehicle, a coupling member movably mounted at one end of the vehicle for selective manual movements into and out of a normal coupling position, means movable to an active position opposing movement of the vehicle, and an inactive position permitting movement of the vehicle, and means connecting the coupling member and said first means for moving the latter to active position when the former is moved out of normal coupling position.

2. In combination with a wheeled vehicle, means supported on the vehicle for movement into locked and unlocked relation with at least one of the vehicle wheels, means resiliently biasing said first means to locked position, a manually operable lever accessible from the exterior of the vehicle for actuating said first means to unlocked position, and means for latching said lever in a position maintaining said first means in unlocked position.

3. In combination with a wheeled vehicle, complementary coupling members respectively disposed at the opposite ends of the vehicle, each of said coupling members being supported for swinging movements to coupling and non-coupling positions, a wheel lock associated with at least one of the vehicle wheels, said lock being normally biased toward locking position, means interconnecting said coupling members and wheel lock operative to retain the wheel lock in unlocked position when either or both of the coupling members are disposed in coupling position, but enable movement thereof to wheel locking position upon movement of both of the coupling members to non-coupling positions.

4. In combination with a wheeled vehicle, complementary coupling members respectively disposed at the oppostie ends of the vehicle, each of said coupling members being supported for swinging movements to coupling and non-coupling positions, a wheel lock associated with at least one of the vehicle wheels, said lock being normally biased toward locking position, and means responsive to the movement of both of said coupling members to non-coupling positions for freeing said wheel lock for biased movement to locking position, but releasing said wheel lock upon movement of either of the coupling members to coupling position.

5. In combination with a wheeled vehicle, complementary coupling members respectively disposed at the opposite ends of the vehicle, each of said coupling members being supported for swinging movements to coupling and non-coupling positions, a wheel lock associated with at least one of the vehicle wheels, said lock being normally biased toward locking position, means interconnecting said coupling members and wheel lock operative to retain the wheel lock in unlocked positions when either or both of the coupling members are disposed in coupling position, but enable movement thereof to wheel locking position upon movement of both of the coupling members to non-coupling positions, and means for releasably latching said coupling members against movement to non-coupling positions.

6. In combination with a wheeled vehicle, a pair of coupling members respectively pivoted at the opposite ends of said vehicle for vertical swinging movements to raised extended positions and lowered depending positions, a latch associated with each of said members for normally retaining the members in raised position, a wheel lock biased toward locked position and maintained in released position by either one or both of said coupling members being disposed in raised position, and a manually operable latch releasing member associated with each of said latches for selectively releasing the coupling members for movement to depending position, said wheel lock being set only when both of said coupling members are disposed in their depending positions.

7. In combination with a wheeled vehicle, a coupling member movably mounted at one end of the vehicle for movements to coupling and non-coupling positions, means movable into active and non-active positions for respectively opposing and enabling movements of the vehicle, a connection between said coupling member and said means for actuating the latter in response to movements of the former, and means normally latching said first means in non-active position when the coupling member is moved to one of said positions.

8. In combination with a wheeled vehicle, a coupling member mounted at one end of the vehicle for movements to positions of use and non-use, means movable into active and non-active positions for respectively opposing and enabling movements of the vehicle, a connection between the coupling member and said means for actuating the latter in response to movements of the former, and a latch operative upon movement of the coupling member to a position of use for retaining the coupling member in its position of use and the first means in non-active position.

9. In combination with a wheeled vehicle, a coupling member mounted at one end of the vehicle for movements to positions of use and non-use, means movable into active and non-active positions for respectively opposing and enabling movements of the vehicle, a connection between the coupling member and said means for actuating the latter in response to movements of the former, a latch operative upon movement of the coupling member to a position of use for retaining the coupling member in its position of use and said means in non-active position, and manually operable means for releasing said latch for enabling movement of the coupling member to its non-use position and the first means to active position.

10. In combination with a wheeled vehicle, means movable into active and non-active positions for respectively opposing and enabling movements of the vehicle, said means being normally biased to one of said positions, a coupling member at one end of the vehicle mounted for swinging movements to positions of use and non-use, and a connection between the coupling member and said means arranged to move said means out of normal position when the coupling member is moved to a position of use, but release said means for free biased movement to normal position, when the coupling is moved to a position of non-use.

11. In combination with a wheeled vehicle, means movable into active and non-active positions for respectively opposing and enabling movements of the vehicle, said means being normally biased to one of said positions, a coupling member at one end of the vehicle mounted for swinging movements to positions of use and non-use, a connection between the coupling member and said means arranged to move said means out of normal position when the coupling member is moved to a position of use, but release said means for free biased movement to normal position, when the coupling is moved to a position of non-use, and means for releasably latching the coupling member in its position of use.

12. In combination with a wheeled vehicle, a coupling member at one end of the vehicle supported for swinging movements to extended and depending positions from the associated vehicle end and biased for movement to the latter position, means movable into active and non-active positions for respectively opposing and enabling movements of the vehicle, and a connection between said coupling member and said means for moving the latter to inactive position when the former is moved to extended position, but release said means for free biased movement to active position when the coupling member is moved to depending position.

13. In combination with a wheeled vehicle, a coupling member at one end of the vehicle supported for swinging movements to extended and depending positions from the associated vehicle end and biased for movement to the latter position, means movable into active and non-active positions for respectively opposing and enabling movements of the vehicle, a connection between said coupling member and said means for moving the latter to inactive position when the former is moved to extended position but release the said means for free biased movement to active position when the coupling member is moved to depending position, and means for releasably latching the coupling member in extended position and against biased movement to its depending position.

LAWRENCE J. KLINE.
JOHN J. SICHMAN.